United States Patent
Shah et al.

(10) Patent No.: US 12,367,032 B1
(45) Date of Patent: Jul. 22, 2025

(54) HOT LOADABLE PROGRAMMABLE STATE MACHINE

(71) Applicant: Advanced Micro Devices, Inc., Santa Clara, CA (US)

(72) Inventors: Siddharth K. Shah, Santa Clara, CA (US); Viswanath Mohan, Santa Clara, CA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 87 days.

(21) Appl. No.: 18/171,325

(22) Filed: Feb. 17, 2023

(51) Int. Cl.
*G06F 8/656* (2018.01)

(52) U.S. Cl.
CPC .................... *G06F 8/656* (2018.02)

(58) Field of Classification Search
CPC ............... G06F 8/656; G06F 8/60–78
USPC .................................. 717/120–178
See application file for complete search history.

(56) References Cited

U.S. PATENT DOCUMENTS

| | | | | |
|---|---|---|---|---|
| 6,075,941 A * | 6/2000 | Itoh | ............. | G06F 11/3636 717/134 |
| 7,350,202 B2 * | 3/2008 | Welfeld | ............. | G06F 9/44 717/170 |
| 8,161,328 B1 * | 4/2012 | Wilshire | ............. | G06F 11/2236 714/34 |
| 9,335,986 B1 * | 5/2016 | Bowen | ............. | G06F 8/656 |
| 2004/0015952 A1 * | 1/2004 | Lajoie | ............. | G06F 8/65 717/176 |
| 2010/0332909 A1 * | 12/2010 | Larson | ............. | G06F 11/3476 714/E11.2 |
| 2012/0146658 A1 * | 6/2012 | Rentschler | ............. | G06F 11/3632 324/537 |
| 2013/0007532 A1 * | 1/2013 | Miller | ............. | G06F 11/349 714/45 |
| 2020/0285461 A1 * | 9/2020 | Kumar | ............. | G06F 9/4401 |

OTHER PUBLICATIONS

Makowski, Dariusz, et al. "Firmware upgrade in xTCA systems." IEEE Transactions on Nuclear Science 60.5 (2013): pp. 3639-3646. (Year: 2013).*

Tan, Chu Jay, et al. "Review on firmware." Proceedings of the International Conference on Imaging, Signal Processing and Communication. 2017.pp. 186-190 (Year: 2017).*

Villarraga, Carlos. Formal Verification of Firmware-Based System-on-Chip Modules. Diss. Technische Universität Kaiserslautern, 2017. pp. 1-137 (Year: 2017).*

Vermeulen, Bart. "Functional debug techniques for embedded systems." IEEE Design & Test of Computers 25.3 (2008): pp. 208-215. (Year: 2008).*

(Continued)

*Primary Examiner* — Satish Rampuria
(74) *Attorney, Agent, or Firm* — Greenberg Traurig, LLP (57) ABSTRACT

The disclosed device includes a debug circuit and a controller. The debug circuit corresponds to a programmable state machine for responding to trigger conditions based on processor events. The controller is configured to receive a hot loadable patch for a processor firmware, apply the hot loadable patch to reprogram a programmable state machine for monitoring processor events, and run the reprogrammed programmable state machine to monitor the processor events. Various other methods, systems, and computer-readable media are also disclosed.

20 Claims, 4 Drawing Sheets

(56) References Cited

OTHER PUBLICATIONS

Kourfali, Alexandra, and Dirk Stroobandt. "In-circuit debugging with dynamic reconfiguration of FPGA interconnects." ACM Transactions on Reconfigurable Technology and Systems (TRETS) 13.1 (2020): pp. 1-29. (Year: 2020).*

Cao, Qing, et al. "Declarative tracepoints: A programmable and application independent debugging system for wireless sensor networks." Proceedings of the 6th ACM conference on Embedded network sensor systems. 2008. pp. 85-98. (Year: 2008).*

* cited by examiner

HOT LOADABLE PROGRAMMABLE STATE MACHINE

BACKGROUND

Some computer architectures use a programmable state machine for debugging or fixing hardware bugs. For example, a programmable state machine can be programmed to detect failure conditions in a processor or system-on-chip (SOC) to trigger a particular state of the programmable state machine. For a given state, the programmable state machine can be programmed to take preventative or other corrective actions. In response to further trigger conditions, the programmable state machine can change states and take corresponding actions. The programmable state machine's program is often embedded in a system's BIOS, which requires a system reboot to update the program.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to a hot loadable programmable state machine. As will be explained in greater detail below, implementations of the present disclosure include applying a hot loadable patch to reprogram a programmable state machine. The systems and methods described herein can advantageously allow reprogramming a programmable state machine without requiring a system reboot, avoiding a costly downtime for a maintenance cycle. The systems and methods described herein also improves the functioning of a computer by allowing faster application of fixes to hardware bugs.

As will be described in greater detail below, the instant disclosure describes various systems and methods for hot loading a debug circuit that corresponds to a programmable state machine. A controller can receive and apply a hot loadable patch and run the reprogrammed debug circuit without requiring a system reboot.

In one implementation, a device for a hot loadable programmable state machine includes controller configured to (i) receive a hot loadable patch for a processor firmware, (ii) apply the hot loadable patch to reprogram a programmable state machine for monitoring processor events, and (iii) run the reprogrammed programmable state machine to monitor the processor events.

In some examples, the programmable state machine corresponds to a debug circuit for responding to trigger conditions based on the processor events. In some examples, applying the hot loadable patch further includes rewriting instructions in one or more registers associated with the programmable state machine to reprogram the programmable state machine.

In some examples, the processor firmware corresponds to microcode. In some examples, the hot loadable patch satisfies a microcode patch size threshold. In some examples, the hot loadable patch includes a fix, utilizing the programmable state machine, for a hardware logic bug. In some examples, the hardware logic bug is not addressable with a current BIOS without a reboot.

In some examples, the hot loadable patch includes an indication of a valid program to reprogram the programmable state machine. In some examples, running the reprogrammed programmable state machine does not require a system reboot. In some examples, applying the hot loadable patch further includes utilizing an operating system.

In one implementation, a system for a hot loadable programmable state machine includes at least one physical processor having a firmware, a debug circuit for the processor corresponding to a programmable state machine for responding to trigger conditions based on processor events, a register for storing a program for the programmable state machine, and a controller. In some examples, the controller is configured to (i) receive a hot loadable patch for a processor firmware, (ii) apply the hot loadable patch without rebooting the system to reprogram the programmable state machine by updating the register, and (iii) run the reprogrammed programmable state machine to monitor the processor events.

In some examples, the processor firmware corresponds to microcode and the hot loadable patch satisfies a microcode patch size threshold. In some examples, the hot loadable patch includes a fix, utilizing the programmable state machine, for a hardware logic bug that is not addressable with a current BIOS without a reboot. In some examples, the hot loadable patch includes an indication of a valid program to reprogram the programmable state machine. In some examples, applying the hot loadable patch further includes utilizing an operating system.

In one example, a method for hot loading a programmable state machine includes (i) receiving a hot loadable patch for a processor firmware, (ii) applying the hot loadable patch, wherein the hot loadable patch includes instructions to update at least one register storing a program for a programmable state machine for responding to trigger conditions based on processor events to reprogram the programmable state machine, and (iii) running the reprogrammed programmable state machine to monitor the processor events.

In some examples, the processor firmware corresponds to microcode and the hot loadable patch satisfies a microcode patch size threshold. In some examples, the hot loadable patch includes a fix, utilizing the programmable state machine, for a hardware logic bug that is not addressable with a current BIOS without a reboot. In some examples, the hot loadable patch includes an indication of a valid program to reprogram the programmable state machine. In some examples, running the reprogrammed programmable state machine does not require a system reboot.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-4, detailed descriptions of a hot loadable programmable state machine. Detailed descriptions of an example system for a hot loadable programmable state machine will be provided in connection with FIG. 1. Detailed descriptions of an example programmable state machine corresponding to a debug circuit will be provided in connection to FIG. 2. Detailed descriptions of an example hot loadable patch will be provided in connection with FIG. 3. Detailed descriptions of corresponding computer-implemented methods will also be provided in connection with FIG. 4.

Figure 1:
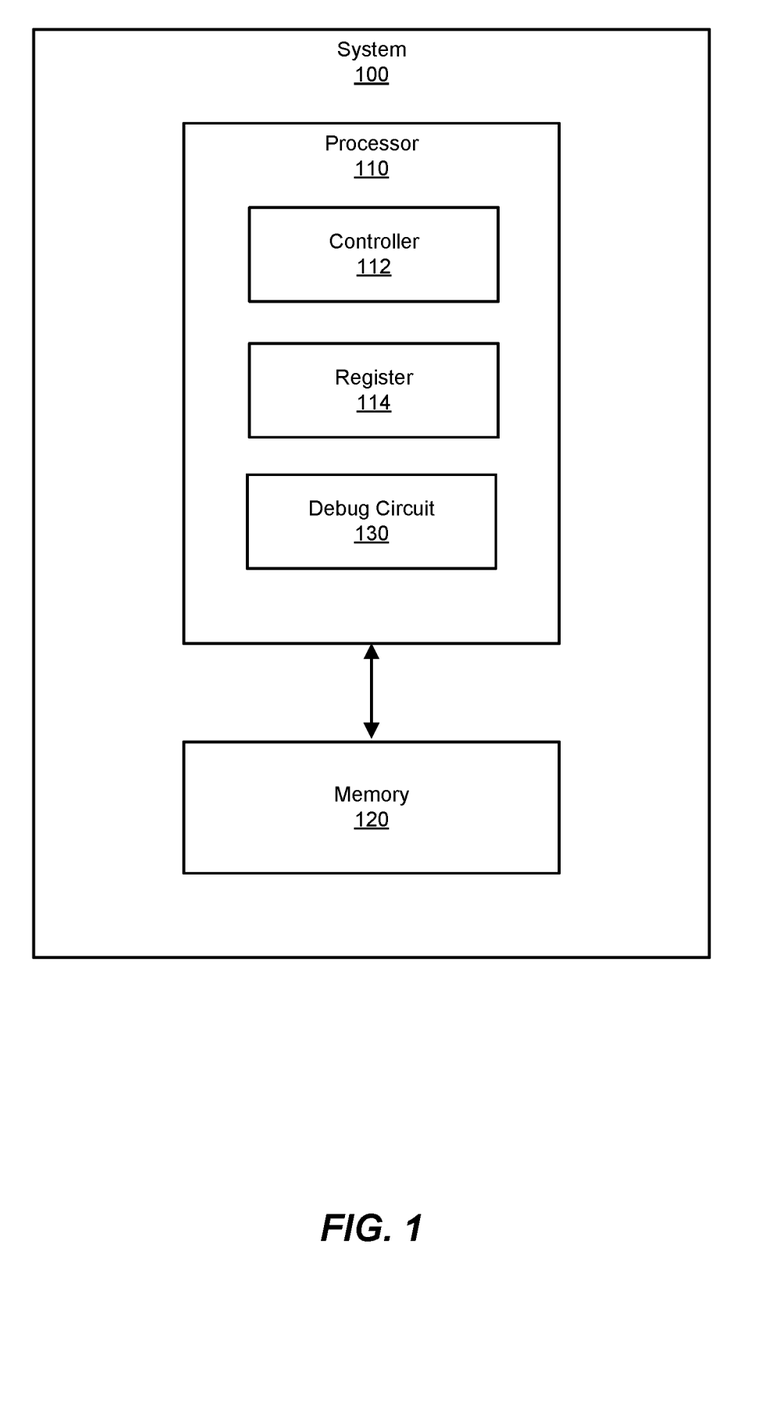
FIG. 1 is a block diagram of an exemplary system for a hot loadable programmable state machine.

FIG. 1 is a block diagram of an example system 100 for a hot loadable programmable state machine. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

As further illustrated in FIG. 1, processor 110 includes a controller 112, a register 114, and a debug circuit 130. Controller 112 corresponds to a circuit that can read and apply hot loadable patches, for example for updating a firmware of processor 110. Register 114 corresponds to a local storage of processor 110 for storing a program for debug circuit 130. Debug circuit 130 is a circuit that corresponds to a programmable state machine that monitors for processor events (such as hardware failure conditions) and can take action in response to certain triggers. Although FIG. 1 illustrates debug circuit 130 as part of processor 110, in some implementations, debug circuit 130 can be separate from processor 110 and/or be part of another subsystem. In some implementations, debug circuit 130 can be programmed (e.g., via register 114) as a state machine for responding to processor events, as illustrated in FIG. 2.

Figure 2:
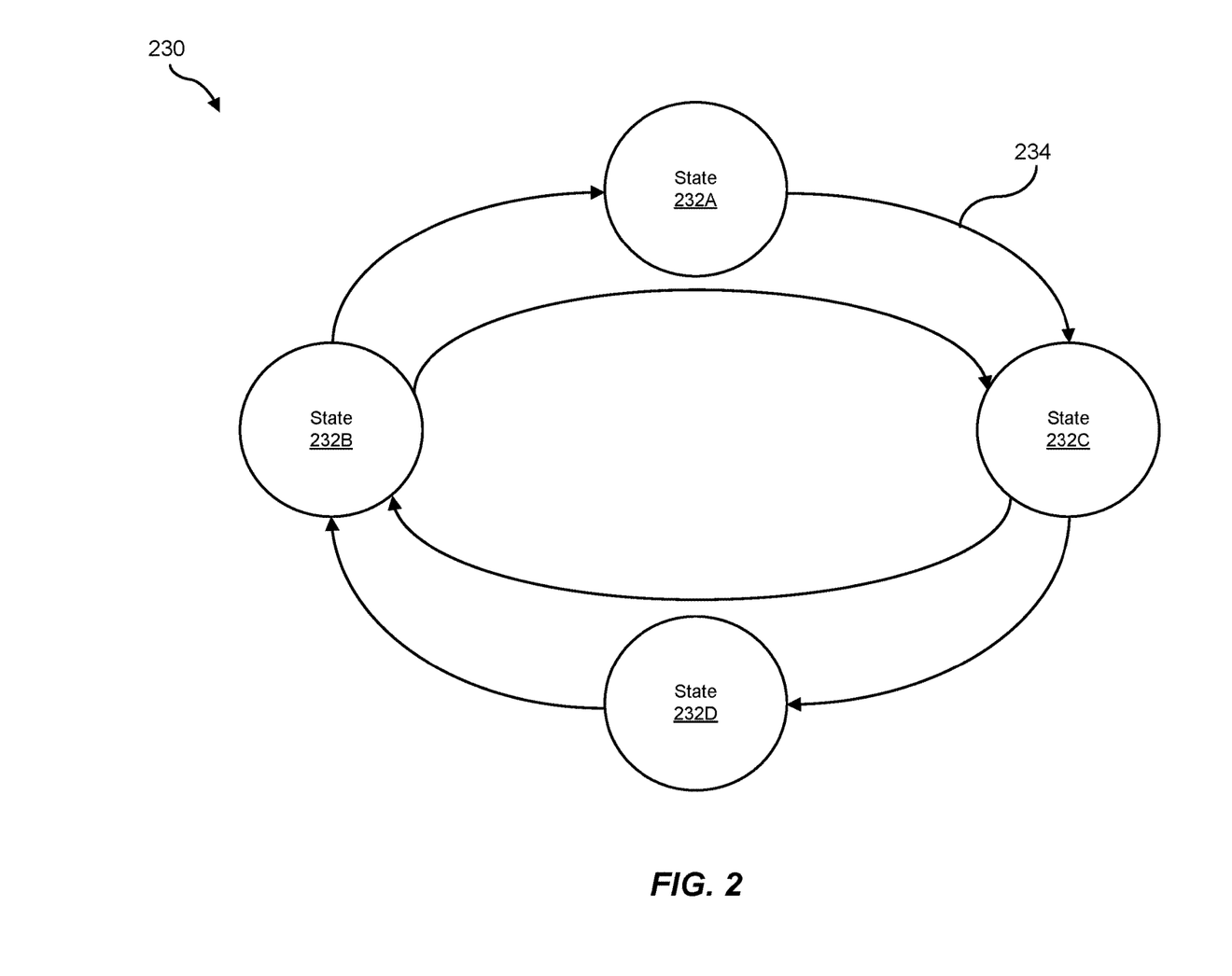
FIG. 2 is a block diagram of an exemplary hot loadable programmable state machine.

FIG. 2 illustrates a simplified diagram of a programmable state machine 230 that corresponds to debug circuit 130. As illustrated in FIG. 2, programmable state machine 230 includes various states and transitions between the states, such as a state 232A, a state 232B, a state 232C, a state 232D, and transitions 234 therebetween. Programmable state machine 230 can, in response to certain trigger conditions, perform state transitions and produce outputs (e.g., take actions).

Programmable state machine 230 can, in some examples, start in a default state such as state 232A and monitor processor events (e.g., from processor 110). For example, programmable state machine 230 (e.g., debug circuit 130) can keep watch on certain signals. Based on trigger conditions, such as a particular signal going high/low after a predetermined number of cycles, programmable state machine 230 can transition to another state as well as perform an action. For example, transition 234 from state 232A to state 232C in response to corresponding trigger conditions can include an action, such as flushing a pipeline, stalling a pipeline, sending interrupts (e.g., to another debug circuit), sending other communications, incrementing a counter (which in some examples can be monitored as a trigger condition), etc.

In some examples, the trigger conditions correspond to hardware bugs, such as logic errors in processor 110 and other errors in subsystems thereof. For instance, a hardware bug can cause particular trigger conditions to occur. The response actions can be corrective and/or preventative of the hardware bugs. In some implementations, programmable state machine 230 (e.g., debug circuit 130) can be used to implement permanent or semi-permanent workarounds (e.g., solutions that reduce or mitigate errors to within a tolerance, or otherwise fixes errors) for hardware bugs. Rather than redesigning and replacing a hardware component, debug circuit 130 can provide a more feasible and immediate solution to the hardware bugs.

In some implementations, debug circuit 130 can include hardware components (e.g., logic components such as gates and flops) for implementing a portion or all of programmable state machine 230. Various other portions of programmable state machine 230, such as trigger conditions, transitions, response actions, etc., can be programmed (e.g., as an updatable program stored in register 114). Additionally, although FIG. 2 illustrates one example of programmable state machine 230, in other examples, programmable state machine 230 can include more or fewer states and other transitions. In addition, programmable state machine 230 can be reprogrammed into a different layout, for example from a patch, such as illustrated in FIG. 3, that updates the program stored in register 114.

Figure 3:
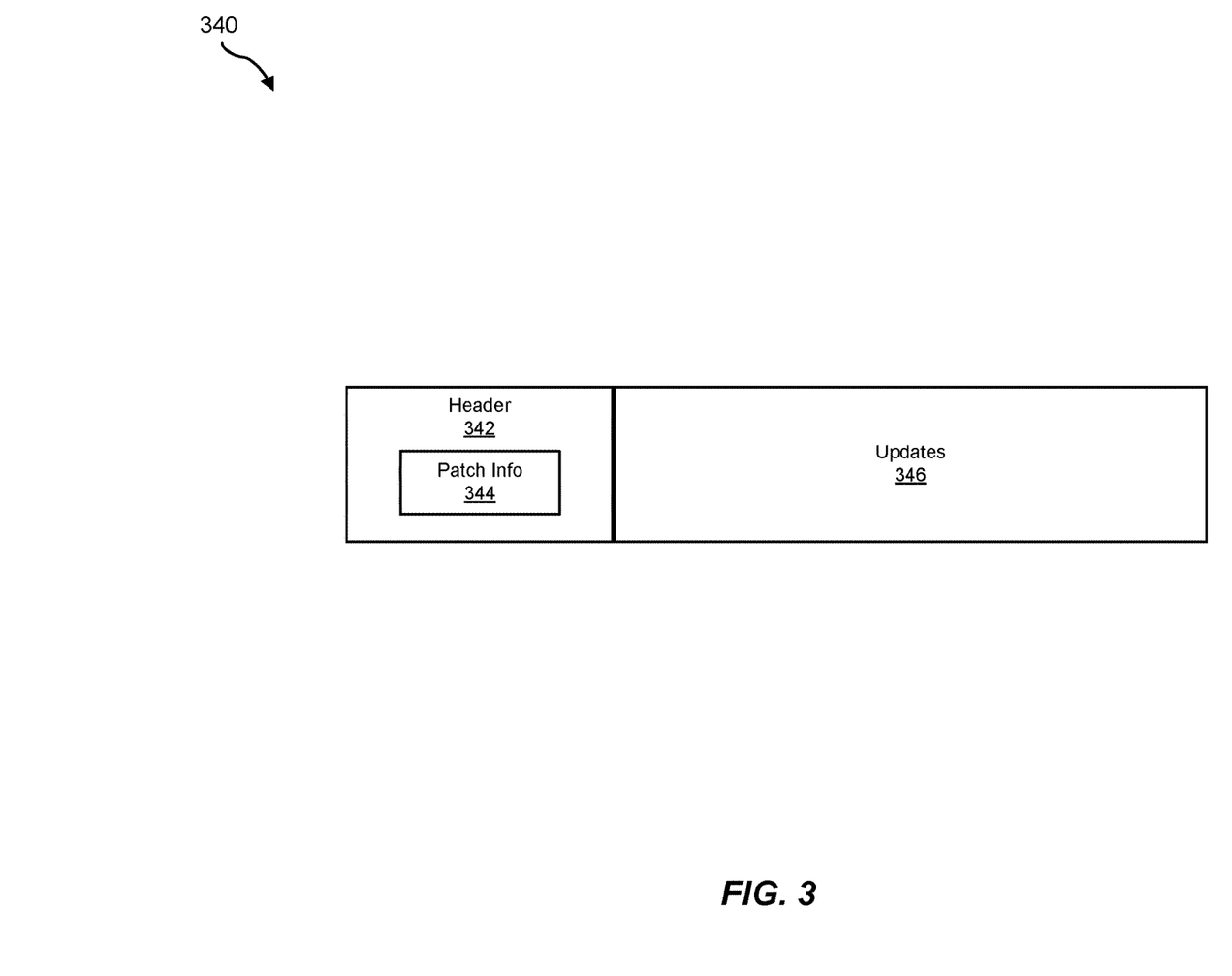
FIG. 3 is a block diagram of an exemplary hot loadable patch for a programmable state machine.

FIG. 3 illustrates a patch 340 that can be used to reprogram a programmable state machine (e.g., programmable state machine 230 and/or debug circuit 130). In some implementations patch 340 can be in a hot loadable patch format. For example, if processor 110 uses microcode, patch 340 can be in a microcode patch format that can be hot loadable. In some examples, a hot loadable patch corresponds to a program and/or code that can be applied while system 100 and/or processor 110 is running, for instance without requiring rebooting system 100. A hot loadable patch can be used update certain code such as firmware for processor 110. Patch 340 can conform to hot loadable patch format requirements, such as size or other format requirements for microcode (e.g., a microcode patch data block).

As illustrated in FIG. 3, patch 340 includes a header 342 containing patch info 344, and updates 346. Header 342 corresponds to a header format, for example corresponding to a microcode patch data block header format, to allow patch info 344 to be read or otherwise parsed. Patch info 344 can include, in some implementations, information about types of patch data components to be processed, such as chicken bits (e.g., bits for enabling/disabling certain hardware features), whether updates 346 include valid instructions for the programmable state machine, and other information.

Updates 346 include, in some implementations, a delta for updating a program for the programmable state machine. In some examples, updates 346 include a program to rewrite a prior program. In some examples, updates 346 include instructions for updating the prior program, such as mask data for updating instructions of the prior program (e.g., preserving and/or modifying specified bits in the program).

Figure 4:
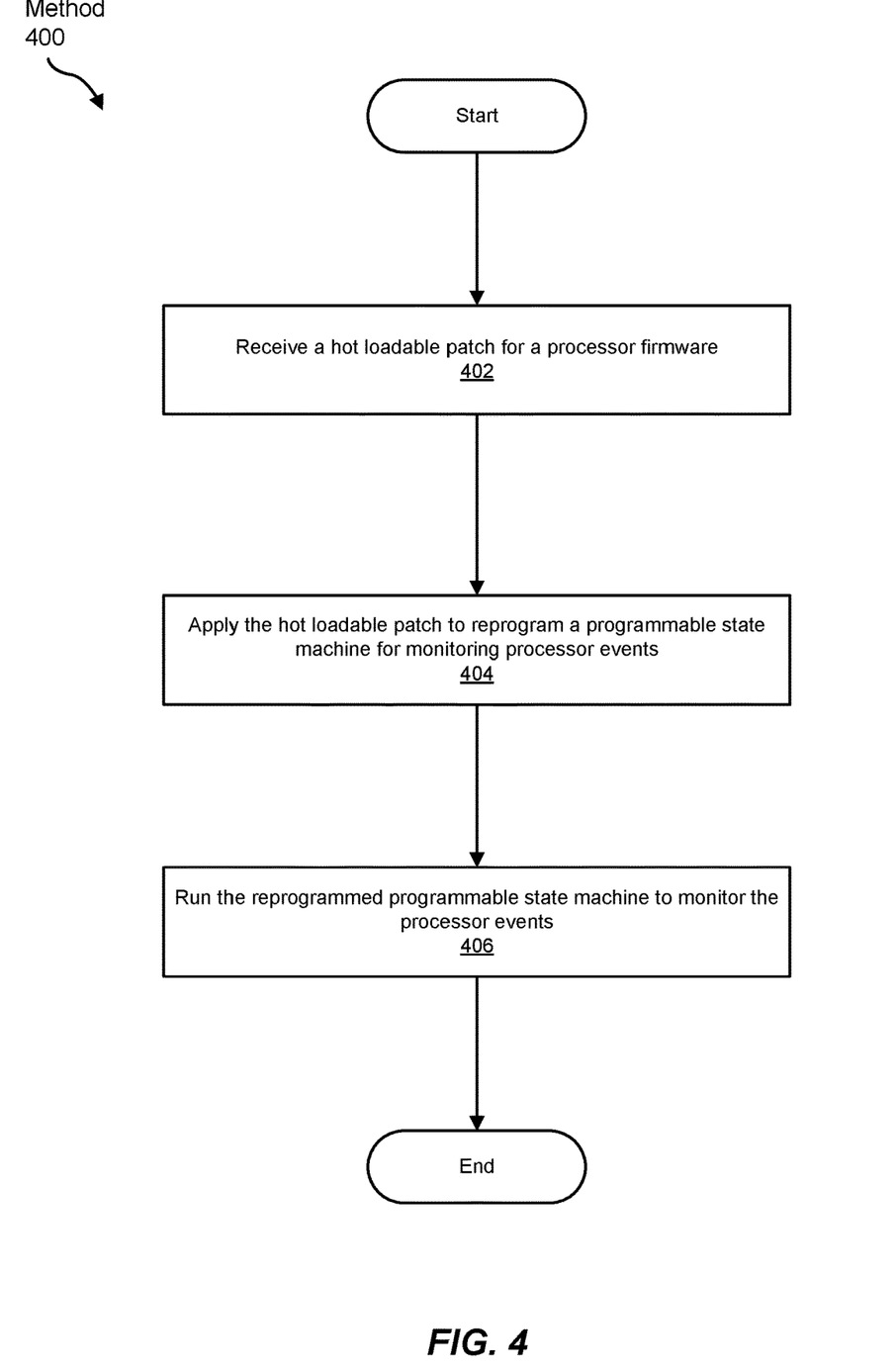
FIG. 4 is a flow diagram of an exemplary method for hot loading a program for a programmable state machine.

FIG. 4 is a flow diagram of an exemplary computer-implemented method 400 for hot loading a programmable state machine. The steps shown in FIG. 4 can be performed by any suitable computer-executable code and/or computing system, including the system(s) illustrated in FIG. 1. In one example, each of the steps shown in FIG. 4 represent an algorithm whose structure includes and/or is represented by multiple sub-steps, examples of which will be provided in greater detail below.

As illustrated in FIG. 4, at step 402 one or more of the systems described herein receives a hot loadable patch for a processor firmware. For example, controller 112 receives a hot loadable patch for a firmware for processor 110.

The systems described herein can perform step 402 in a variety of ways. In some implementations, the programmable state machine corresponds to a debug circuit for responding to trigger conditions based on the processor events. In some implementations, the hot loadable patch includes a fix and/or workaround, utilizing the programmable state machine, to address a hardware logic bug. For example, the hot loadable patch can prevent the hardware logic bug from occurring, and/or can reduce or mitigate errors (to within an acceptable tolerance) resulting from the hardware logic bug. In some examples, the hardware logic bug is not addressable with a current BIOS without a reboot. For instance, addressing the hardware logic bug via BIOS can require and updated BIOS and rebooting the system, which can be a long process (e.g., requiring testing the updated BIOS, a rollout process causing system down time, etc.).

Further, in some implementations, the processor firmware corresponds to microcode. For example, the hot loadable patch satisfies a microcode patch size threshold. In some examples, the hot loadable patch includes an indication of a valid program to reprogram the programmable state machine.

At step 404 one or more of the systems described herein applies the hot loadable patch to reprogram a programmable state machine for monitoring processor events. For example, controller 112 applies the hot loadable patch (e.g., to register 114) to reprogram debug circuit 130.

The systems described herein can perform step 404 in a variety of ways. In one example, applying the hot loadable patch further includes utilizing an operating system. In some implementations, applying the hot loadable patch further includes rewriting instructions in one or more registers associated with the programmable state machine to reprogram the programmable state machine.

At step 406 one or more of the systems described herein runs the reprogrammed programmable state machine to monitor the processor events. For example, controller 112 and/or processor 110 can run debug circuit 130 using the updated program in register 114.

The systems described herein can perform step 406 in a variety of ways. In one example, running the reprogrammed programmable state machine does not require a system reboot.

As detailed above, the present disclosure is directed to using a microcode patch to hot load, in one implementation, a Debug State Machine (DSM). The hot loading of a DSM workaround can be done as part of the microcode patch load process. A data block known as PDATA (Patch Data Block) follows the Patch layout in memory. The systems and methods described herein can use an existing software infrastructure and piggyback on microcode patch loading mechanisms.

Whenever there is a bug in a SOC, one way to address the issue is to use the DSM. The DSM can be programmed to detect the failure conditions and take preventive actions. The DSM logic can be applied an image which is embedded in the BIOS. Thus, a customer who needs the workaround has to deploy a new BIOS which contains the fix (e.g., a fix for the DSM logic or a DSM recipe). However, a BIOS deployment cycle can be extremely long and expensive. The customer also suffers a downtime of the systems that need the fix deployed. DSM workarounds to fix silicon issues through an existing patch load mechanism and infrastructure can make QA cycles extremely small, prevents the need for a new BIOS, and prevents downtime when the fix is deployed.

To avoid the BIOS deployment cycle, the systems and methods described herein can use a microcode patch to hot load a DSM workaround. The hot loading of a DSM workaround is done as part of the microcode patch load process. A data block known as PDATA (Patch Data Block) follows the patch layout in memory, which in some implementations can be raw data that does not consume valuable patch code space. The microcode during patch load discovers a hint which indicates the presence of a valid PDATA block. During the patch load, the microcode can load the header byte (e.g., first four bytes) of the PDATA block. If the header byte is non-zero, it can indicate that a valid Patch Data follows the header bytes. The PDATA block can support several components of which DSM hot loading is one feature. The bits of the header can indicate that a valid DSM recipe is available in the PDATA block. The DSM recipe in the PDATA block can follow a format that is adhered to by the patch writer. For example, the PDATA block can include an address of the register for the DSM, and the program patch (e.g., updated values and/or bit masks for calculating updated values) for updating the DSM program.

As detailed above, the computing devices and systems described and/or illustrated herein broadly represent any type or form of computing device or system capable of executing computer-readable instructions, such as those contained within the modules described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
a controller configured to:
load a hot loadable patch for updating a processor firmware of one or more processors, wherein the one or more processors includes a debug circuit configured as a programmable state machine to respond to processor hardware events of the one or more processors, and wherein the hot loadable patch includes an indicator for a patch data block that includes one or more instructions to update at least one register storing a program for the debug circuit;
reprogram, using the one or more instructions in the patch data block indicated by the hot loadable patch to update the at least one register, the programmable state machine; and
operate the debug circuit to monitor the processor hardware events by running the reprogrammed programmable state machine.

2. The device of claim 1, wherein the debug circuit is configured to respond to the processor hardware events based on trigger conditions, defined with the reprogrammed programmable state machine.

3. The device of claim 1, wherein reprogramming the programmable state machine further comprises rewriting instructions in one or more registers of the debug circuit to reprogram the programmable state machine and running the reprogrammed programmable state machine comprises executing the rewritten instructions in the one or more registers.

4. The device of claim 3, wherein the one or more instructions in the patch data block includes one or more addresses for the one or more registers of the debug circuit.

5. The device of claim 1, wherein the processor firmware corresponds to microcode, the hot loadable patch satisfies a microcode patch size threshold, and a size of the patch data block is separate from the microcode patch size threshold for the hot loadable patch.

6. The device of claim 1, wherein the one or more instructions includes a fix, utilizing the programmable state machine, for a hardware logic bug of the one or more processors.

7. The device of claim 6, wherein the hardware logic bug is not addressable with a current BIOS without a system reboot and running the reprogrammed programmable state machine does not require the system reboot.

8. The device of claim 6, wherein the fix reduces errors resulting from the hardware logic bug.

9. The device of claim 1, wherein the hot loadable patch includes an indication of a valid program to reprogram the programmable state machine.

10. The device of claim 1, wherein applying-loading the hot loadable patch further comprises utilizing an operating system.

11. A system comprising:
at least one physical processor having a firmware;
a debug circuit for the at least one physical processor configured as a programmable state machine for responding to trigger conditions based on processor hardware events of the at least one physical processor;
a register for storing a program for the programmable state machine; and
a controller configured to:
load a hot loadable patch for updating a processor firmware of the at least one physical processor, wherein the hot loadable patch includes an indicator for a patch data block that includes one or more instructions to update the register;

reprogram, using the one or more instructions in the patch data block indicated by the hot loadable patch to update the register, the programmable state machine; and operate the debug circuit to monitor the processor hardware events by running the reprogrammed programmable state machine.

12. The system of claim 11, wherein the processor firmware corresponds to microcode, the hot loadable patch satisfies a microcode patch size threshold, and a size of the patch data block is separate from the microcode patch size threshold for the hot loadable patch.

13. The system of claim 11, wherein one or more instructions includes a fix, utilizing the programmable state machine, for a hardware logic bug of the at least one physical processor that is not addressable with a current BIOS without a reboot.

14. The system of claim 11, wherein the hot loadable patch includes an indication of a valid program to reprogram the programmable state machine.

15. The system of claim 11, wherein loading the hot loadable patch further comprises utilizing an operating system.

16. A method comprising:

loading a hot loadable patch for updating a processor firmware of one or more processors, wherein the one or more processors includes a debug circuit configured as a programmable state machine for responding to trigger conditions based on processor hardware events of the one or more processors;

detecting, in response to loading the hot loadable patch, a patch data block indicated by the hot loadable patch, wherein the patch data block includes instructions to update at least one register storing a program for the debug circuit;

reprogramming, using one or more instructions in the patch data block to update the at least one register, the programmable state machine; and operating the debug circuit to monitor the processor hardware events by running the reprogrammed programmable state machine.

17. The method of claim 16, wherein the processor firmware corresponds to microcode, the hot loadable patch satisfies a microcode patch size threshold, and a size of the patch data block is separate from the microcode patch size threshold for the hot loadable patch.

18. The method of claim 16, wherein the one or more instructions includes a fix, utilizing the programmable state machine, for a hardware logic bug that is not addressable with a current BIOS without a reboot.

19. The method of claim 16, wherein the hot loadable patch includes an indication of a valid program to reprogram the programmable state machine.

20. The method of claim 16, wherein running the reprogrammed programmable state machine does not require a system reboot.

* * * * *